April 10, 1951  T. B. CHACE ET AL  2,548,651
FLUID CONTROL SYSTEM FOR LAUNDERING APPARATUS
Filed March 20, 1944  8 Sheets-Sheet 6
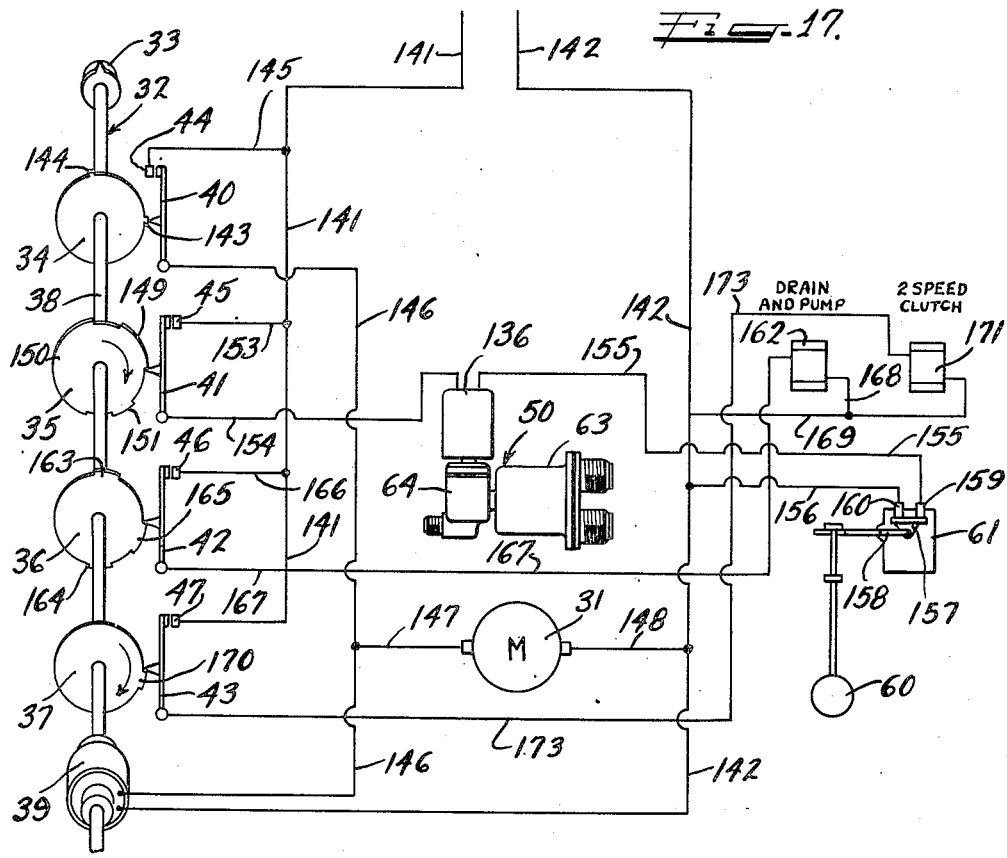
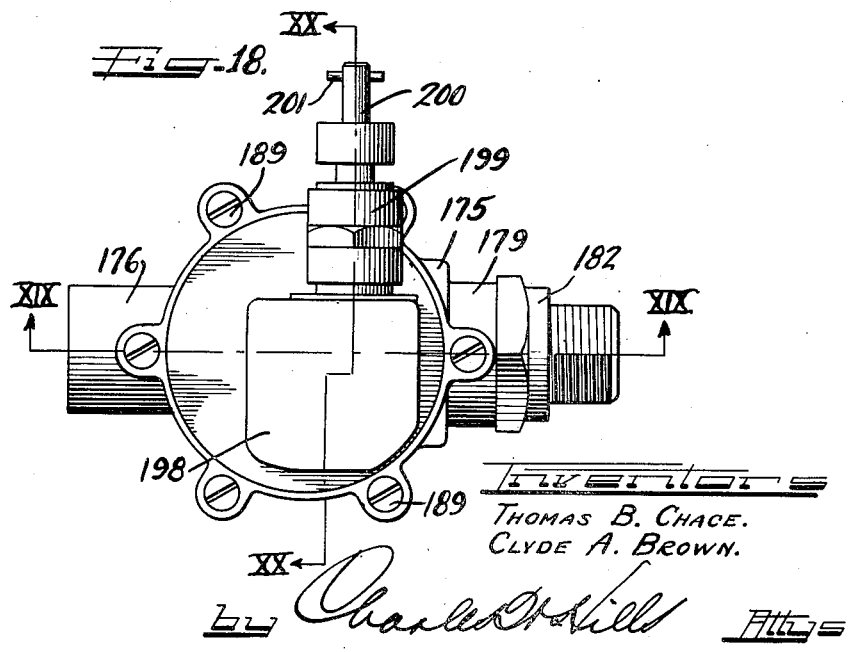
Inventors
Thomas B. Chace.
Clyde A. Brown.

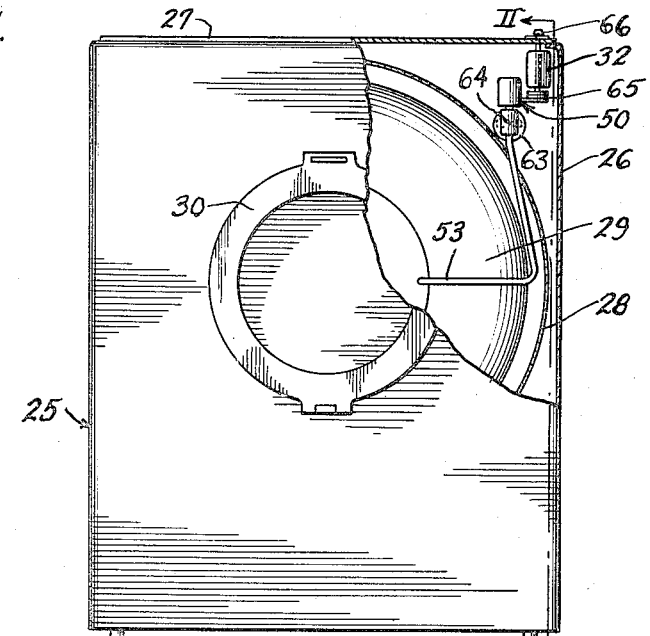
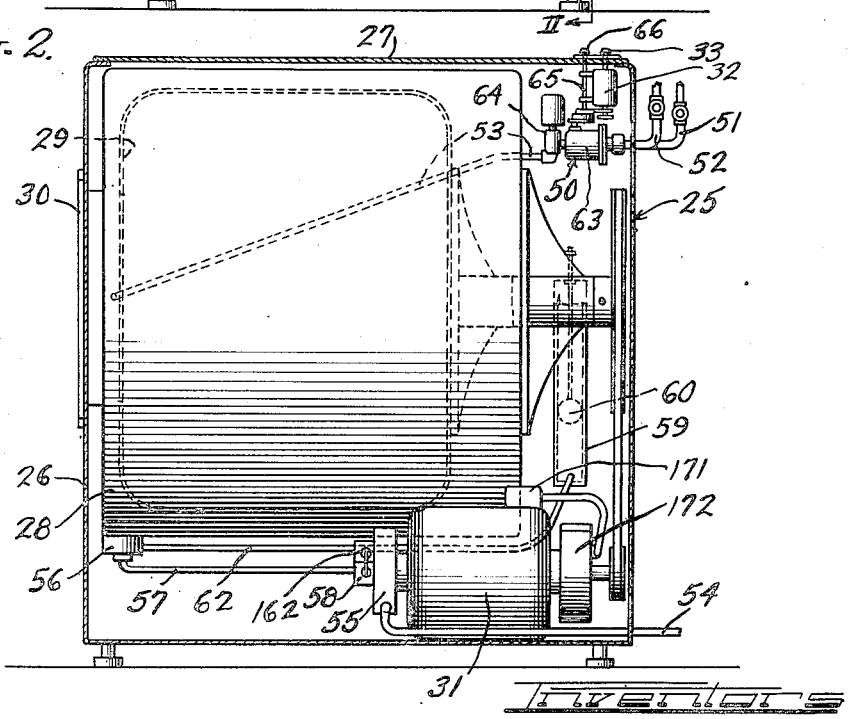

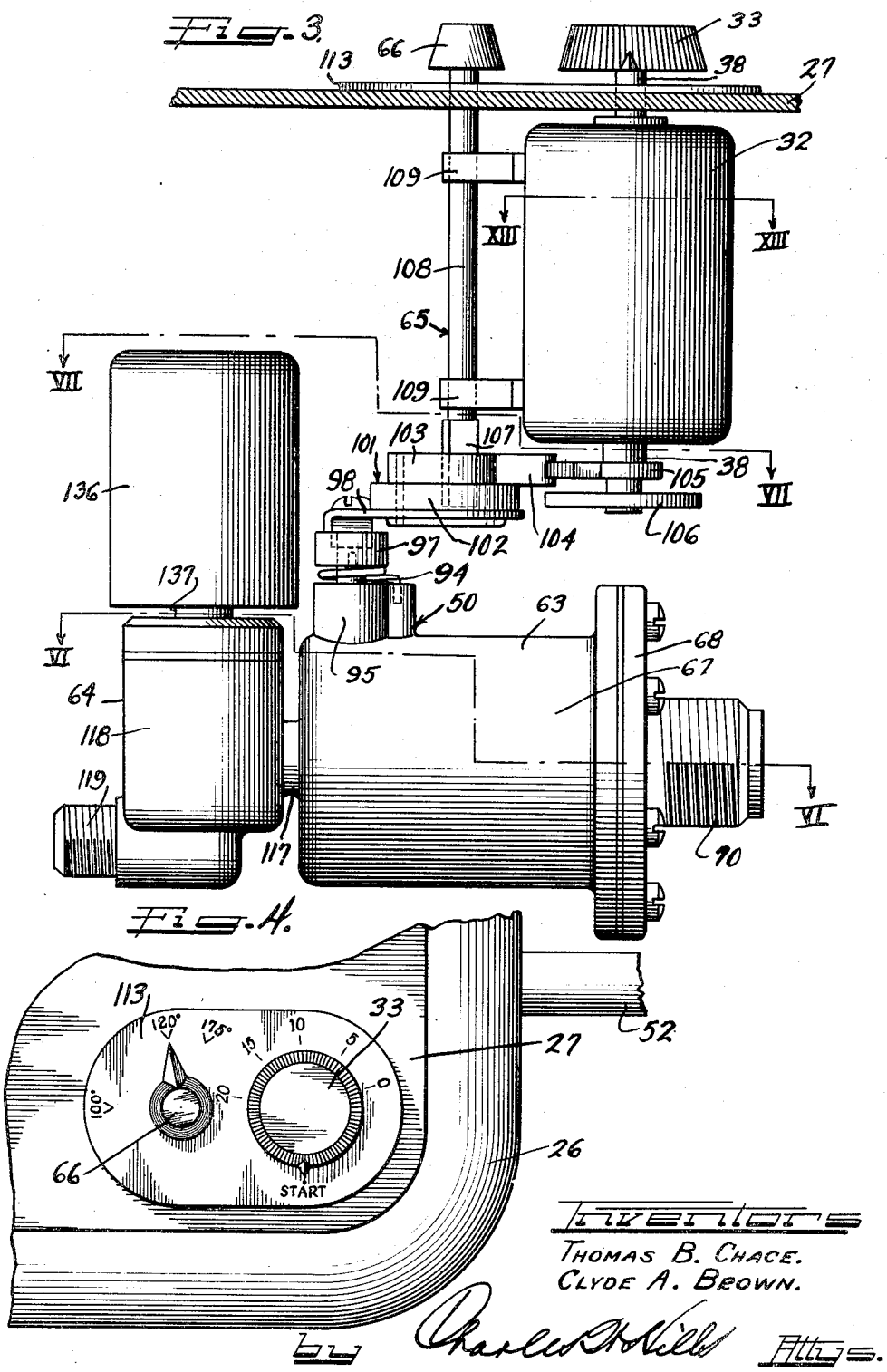

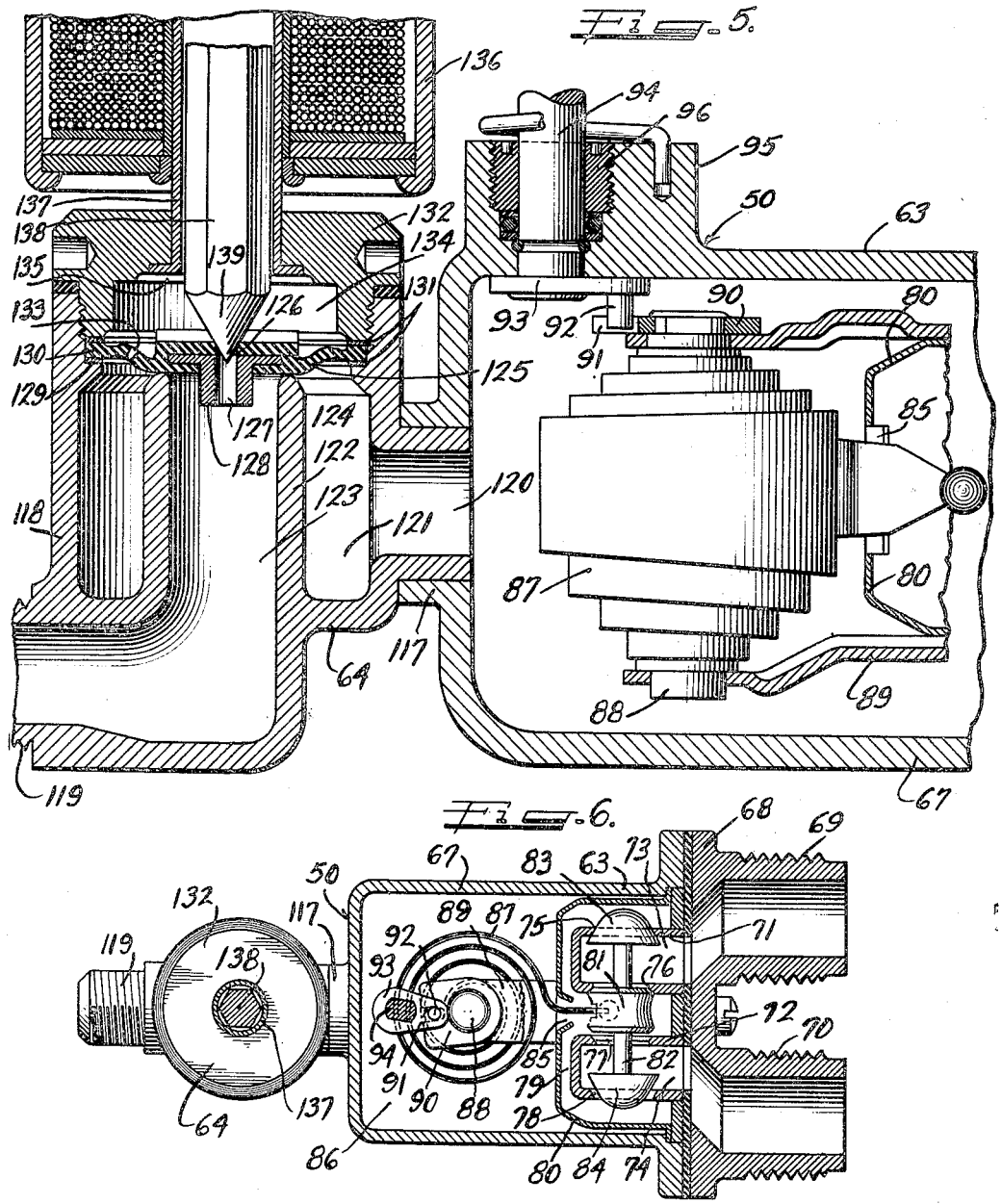

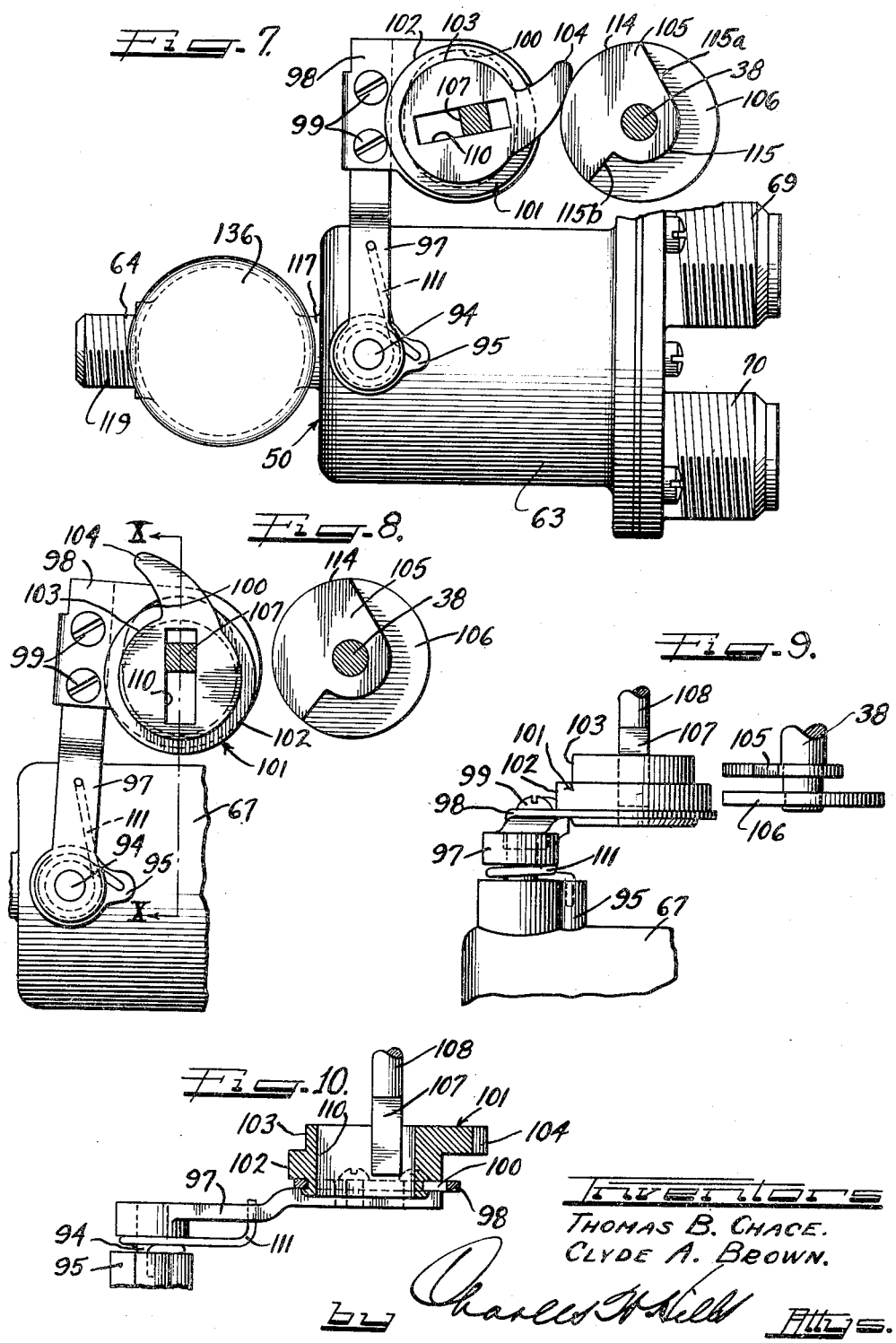

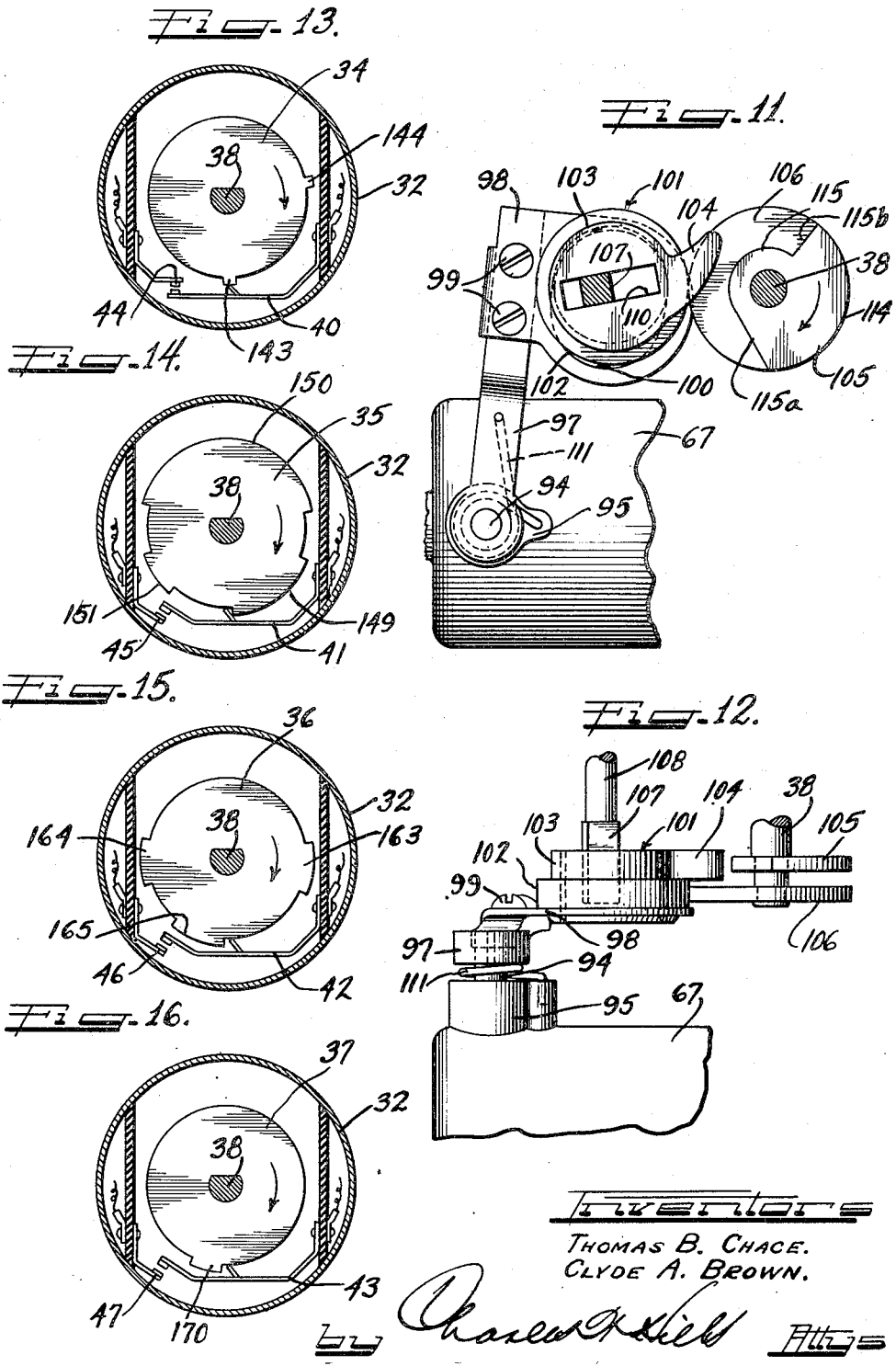

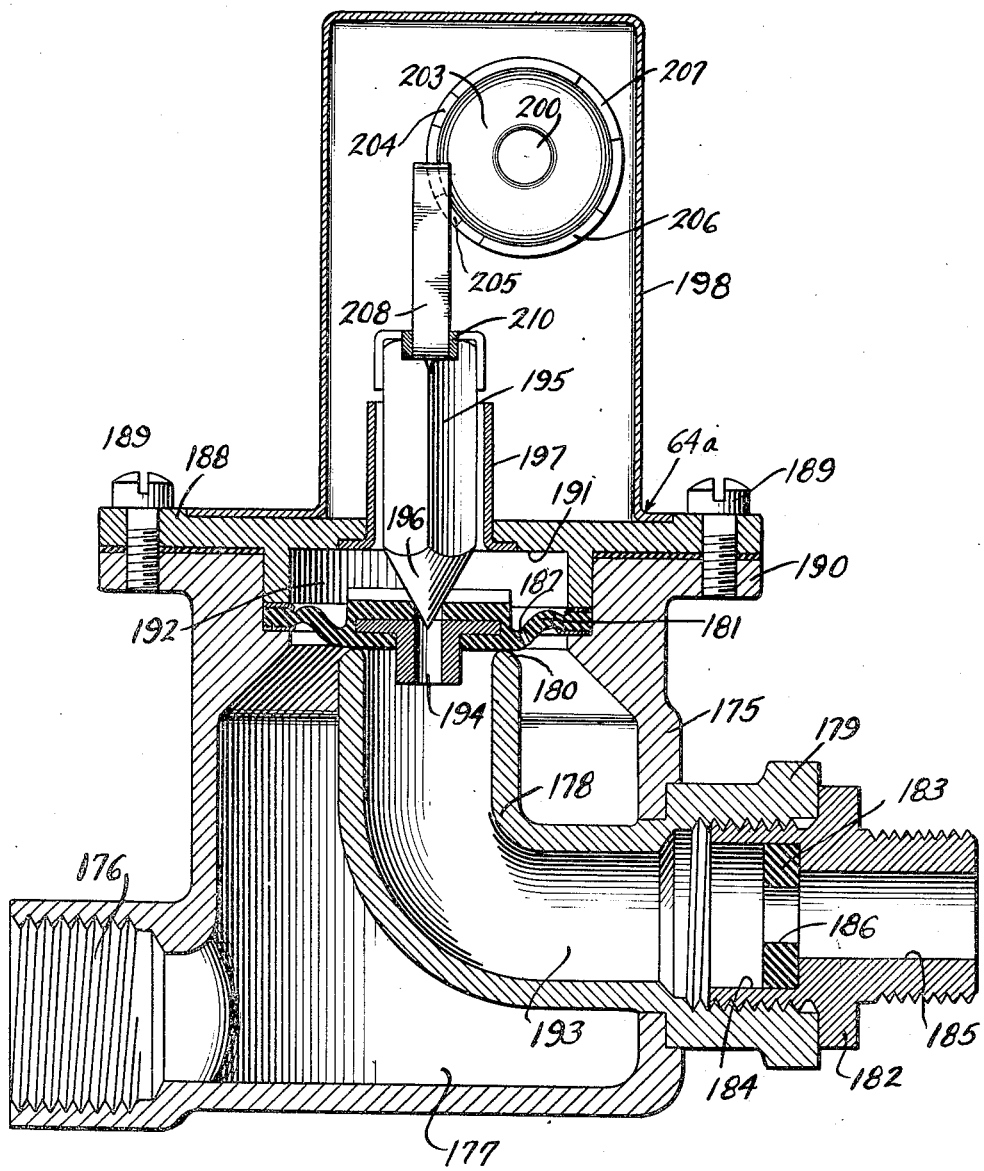

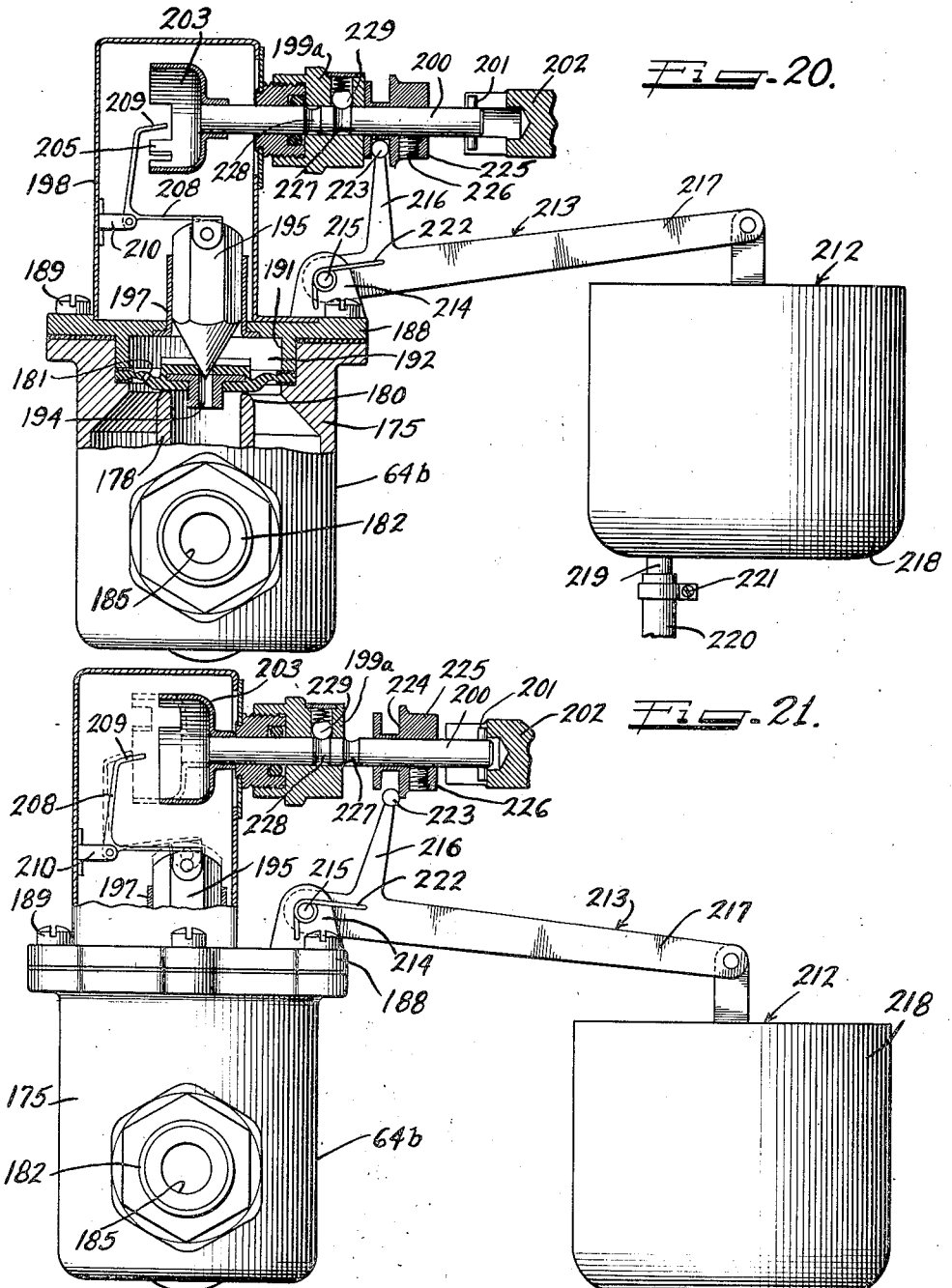

Patented Apr. 10, 1951

2,548,651

UNITED STATES PATENT OFFICE 2,548,651

FLUID CONTROL SYSTEM FOR LAUNDERING APPARATUS

Thomas B. Chace and Clyde A. Brown, Chicago, Ill., assignors to The Dole Valve Company, Chicago, Ill., a corporation of Illinois Application March 20, 1944, Serial No. 527,190

20 Claims. (Cl. 68—12)

This invention relates generally to a fluid control system. More particularly, the invention is concerned with control means for supplying fluid such as may be employed in cleansing apparatus of the type which performs a plurality of operations in a complete cycle at least certain of which require fluid of different temperatures and quantities.

One form of cleansing aparatus in which the fluid control system of the present invention is particularly advantageously employed is the automatic laundry machine. In such equipment, a succession of operations including a soaking step, a washing step and one or more rinsings may be required, at least certain of which employ different quantities of water at different temperatures. In general, a washing step requires a greater quantity of water of a higher temperature than does a rinsing step. The ability to change the temperature of the water for each operation makes possible a substantial saving in the supply of hot water.

It is also desirable to provide in the automatic laundry apparatus means for manually adjusting the temperature range for the water employed in laundering of different classes of fabrics. For the laundering of silks, certain artificial silks, woolens, and the like, for example, it is essential that the temperature of the water for any of the several steps performed does not exceed some predetermined maximum, such for example as a maximum of 100° F. to prevent shrinkage and attendant deterioration of the fabric. In the cleansing of cotton and linen articles, however, it is desirable to employ water ranging in temperature from 75 to 100° F. for the soaking step, 100 to 175° F. for the washing step, and 75 to 100° F. for the several rinses.

The present invention contemplates the provision of suitable means not only for selectively controlling the temperature of the cleansing fluid to be employed in the cleansing operation in keeping with the type of the fabric to be cleansed but also to supply fluid at the desired temperature for each individual operation. The device of the present invention, besides providing a fluid supply of proper quantity and temperature for each step in a complete cycle of operations automatically insures maintenance of the desired uniform temperature of the fluid for each operation in the cycle.

The aforementioned factors are highly important in the use of an automatic home laundry machine. In such aparatus, for instance, it may be desired to employ water of a temperature of 175° F. in the washing step. It is not necessary to use water of such a high temperature for the soaking and rinsing steps. The ability to vary the temperature of the water in the course of the performance of the complete washing cycle of the apparatus greatly reduces the quantity of hot water required to complete the laundering of a number of batches of soiled articles and fabrics.

Inasmuch as the soaking and rinsing steps do not require, in most instances, exceedingly hot water, it is a material saving in the volume of hot water required when a suitable means is inserted which affords an opportunity for changing the water temperature for these particular steps during the cycle of operation. The fluid control system of the present invention presents a highly efficient means for automatically varying the temperature of the cleansing fluid for each of the several cleansing operations performed by an automatic cleansing apparatus.

It is, therefore, an object of the present invention to provide an automatically operated fluid control system which possesses the above mentioned advantageous features and yet is economical to manufacture and install in fluid handling apparatus.

It is a further object of the present invention to provide a temperature control means for supplying fluid mixtures at varying ranges of temperature in accordance with the character of the operations to be performed with the aid of said fluid.

It is a still further object of the present invention to provide a temperature control means capable of selective adjustment to deliver fluid of the proper temperature to cleansing apparatus or the like with which it is associated which will not deleteriously affect the articles being cleansed all of which possess certain definite characteristics which cause them to react differently to fluids of different temperatures.

Another and still further object of the present invention is to provide a temperature control mechanism which operates automatically in compliance with the operating schedule of an automatic cleansing apparatus embodying a plurality of successive steps to provide several charges of fluid to the apparatus at different temperatures in keeping with the nature of each particular step in the cycle of operations.

A still further object of the present invention is to provide a fluid control system which controls both the quantity and the temperature of the fluid supplied to the apparatus with which it is associated for each of a plurality of individual operations in the cycle performed by said apparatus.

Still other features and advantages of the apparatus of the present invention will be apparent from the following description of one form of fluid control system and temperature control means embodying the principles of the present invention.

For the sake of simplification, but in no sense of limitation, the present invention will be described in its application to an automatic washing, rinsing and drying apparatus of a type employed in home laundering operations.

The novel features which we believe to be characteristic of our invention are set forth with particularity in the appended claims. Our invention itself, however, both as to organization and manner of construction, together with further objects and advantages thereof, may best be understood by reference to the accompanying drawing, in which:

Figure 1 is a front elevation with parts broken away illustrating one form of automatic laundry machine embodying the teachings of the present invention;

Figure 2 represents a vertical cross-section taken along the line II—II in Figure 1;

Figure 3 is a side elevation at an enlarged scale of the fluid control mechanism associated with the apparatus illustrated in Figures 1 and 2;

Figure 4 is a partial plan view of a corner of the apparatus of Figures 1 and 2 illustrating the arrangement of the manual controls for the laundry machine and the fluid control mechanism;

Figure 5 is a vertical section through the thermostatic mixing valve element and shut-off unit of the fluid control mechanism illustrated in Figure 3 at an enlarged scale;

Figure 6 is a horizontal cross-section taken substantially along the line VI—VI in Figure 3;

Figure 7 is a plan view with parts in section of the thermostatic mixer valve element and associated parts of the fluid control mechanism illustrated in Figure 3 as seen from the line VII—VII therein;

Figure 8 is a fragmentary plan view corresponding to Figure 7 but with parts of the control mechanism in slightly different operating relations;

Figure 9 is a side elevation of the apparatus shown in Figure 8;

Figure 10 is a vertical cross-section taken along the line X—X in Figure 8;

Figure 11 corresponds generally to Figures 7 and 8 but illustrates the parts of the control mechanism in still another phase of their operations;

Figure 12 is a side elevation of the apparatus of Figure 11;

Figure 13 is a horizontal cross-section taken substantially along the line XIII—XIII in Figure 3;

Figures 14, 15 and 16 correspond generally to Figure 13 but represent horizontal cross-sections taken at several different points along the vertical axis of the unit shown in Figure 3 and below the line XIII—XIII therein;

Figure 17 is a diagrammatic representation of a typical wiring diagram for incorporating the fluid control mechanism of the invention in the control circuit of a typical automatic washing machine;

Figure 18 is a plan view of another form of shut-off valve for use in the fluid control mechanism of Figure 3 to replace the solenoid operated shut-off element;

Figure 19 is a vertical cross-section taken substantially along the line XIX—XIX of Figure 18;

Figure 20 is a vertical cross-section substantially along the line XX—XX in Figure 18 with parts in elevation illustrating still another form of shut-off valve or unit embodying a weight control element; and Figure 21 is a vertical cross-section with parts in elevation corresponding generally to that of Figure 20 with the several parts of the apparatus disposed in another phase of their operations.

In Figures 1 and 2 is illustrated one form of automatic home laundry machine 25 with which the fluid control system of the present invention is particularly advantageously employed. The machine 25 comprises generally a cabinet 26 having a top panel 27 enclosing a container or tub 28 in which a perforated basket 29 is rotatably mounted. Access is afforded to the basket 29 through the door 30 in one of the side panels of the cabinet 26. A motor 31 is provided to drive the basket 29 and operate certain other parts of the apparatus associated therewith.

A suitable timer unit 32 is provided for controlling the automatic operation of the laundry machine 25 throughout a complete cycle of operations including such steps as, soaking, washing, rinsing and drying. The timer unit 32 which may be of any suitable type is adjustably controlled by means of a knob 33 mounted on the exterior and adjacent one corner of the top panel 27 of the cabinet 26 (see Figure 4). The timer unit 32 is diagrammatically illustrated in Figure 17 as embodying a plurality of cams 34 to 37, inclusive, secured to a shaft 38 which is adapted to be rotated by a motor 39. Each of the cams 34 to 37, inclusive, have associated therewith one of a corresponding number of movable contact arms 40 to 43, inclusive, which cooperate with the respective fixed contacts 44 to 47, inclusive (see Figures 13, 14, 15 and 16).

The fluid control mechanism 50 for supplying mixed water to the tub 28 of the laundry machine 25 at the proper temperature and in the proper quantities in keeping with the particular steps in the cycle of operations being performed by said laundry machine is disposed in a corner of the cabinet adjacent the timer unit 32. The fluid control mechanism 50 is connected to suitable supply conduits 51 and 52 supplying cold and hot water, respectively, and delivers the mixed water to the tub 28 of the laundry machine 25 by means of a tube 53 which is adapted to extend part way into the open end of the basket 29.

The water in the tub 28 of the laundry machine 25 is discharged therefrom through a suitable discharge pipe 54 by means of a pump 55 disposed adjacent to and actuated by the motor 31. The pump 55 is connected to a sump 56 formed in the base of the tub 28 by means of a pipe 57 in which is disposed a drain valve 58. A suitable stand-pipe 59 having therein a float member 60 for actuating a switch means 61 (see Figure 17) for controlling certain of the operations of the laundry machine 25 is connected to the sump 56 by means of a pipe 62.

As will be best understood from Figures 3–12, inclusive, the fluid control mechanism 50 embodies a thermostatically operated mixing valve 63, an automatic shut-off valve 64 and a manually operated adjustment means 65. The adjustment means 65 is provided with a control knob 66 disposed in the top panel 27 adjacent to the timer control knob 33 (see Figure 4). The mixing valve 63 of the fluid control means 50 serves to mix the hot and cold water from the respective conduits 51 and 52 to provide water of the proper temperature for the several laundering operations performed by the laundry machine 25. The operation of the mixing valve 63 of the fluid control means 50 is selectively determined by the manual setting of the adjustment means 65, while the shut-off valve 64 serves to control the delivery of the water to the tub 28 of the laundry machine 25.

The mixer valve 63 has a casing 67 on which is fitted a removable cover member 68 having connections 69 and 70 which are adapted to be connected, in any suitable manner, with the conduits 51 and 52, respectively, for supplying cold and hot water to the valve (see Figure 6). Enclosures 71 and 72 adjacent the connections 69 and 70, respectively, form therein the respective inlet passages 73 and 74 and are each provided with a pair of ports 75, 76, 77, 78 for the passage of each fluid into the mixing chamber 79 formed within the housing 80 disposed about the exterior of the enclosures 71 and 72. The flow of fluid through the ports 76 and 77 is controlled by opposed faces of a valve member 81 which is substantially centrally disposed upon a rod 82 while the ports 75 and 78 are regulated by the valve members 83 and 84, respectively, mounted upon opposite ends of the rod 82.

The housing 80 has an aperture 85 therein which interconnects the mixing chamber 79 and the thermostat chamber 86. One end of the thermostat 87, which may be of any suitable type such, for example, as a bimetallic coil, projects through the aperture 85 and is connected to the valve member 81 to support the several valves 81, 83 and 84 in laterally shiftable relation with respect to the several ports 75, 76, 77 and 78. The other end of the thermostat 87 is secured to a pin 88 which is mounted for rotation about its longitudinal axis in a support 89.

The thermostat 87 is adapted to be selectively adjusted to respond to different desired temperatures by the rotation of the pin 88 in the support 89. This adjustment of the thermostat 87 may be afforded by a lever arm 90 secured to the pin 88, said arm having a slot 91 which accommodates a crank pin 92 secured to a suitable crank arm 93. The crank arm 93 is fixed to the squared end of a shaft 94 which extends through an external boss 95 formed on the casing 67 and is rotatably mounted in a bearing insert 96 fitted therein. The end of the shaft 94 which projects through the boss 95 is adapted to be operatively connected to the adjustment means 65.

The adjustment 65 includes an arm 97 which is secured to the shaft 94 and is adapted to rotate the shaft to shift the crank arm 93, the lever arm 90 and the pin 88 for coiling or uncoiling the thermostat 87 to vary the temperature setting therefor. The thermostat 87 is preferably of the type which, upon being coiled up or tightened, will serve to raise the temperature of the fluid mixture. The arm 97 has a bracket 98 secured to the free end thereof as by means of the screws 99. The bracket 98 has an elongated opening 100 formed therein (see Figures 7 and 8) to receive a member 101 in both slidable and rotatable relation with respect to said bracket.

The member 101 is provided with a generally circular peripheral portion 102 and a second peripheral portion 103, preferably formed as integral parts of the member 101, said portion 103 being provided with a projecting finger 104 formed thereon. On the end of the shaft 38 of the timer unit 32 opposite that on which the knob 33 is secured, is mounted a pair of spaced cams 105 and 106 which are so disposed that they are capable of contacting the portion 102 or the finger 104 of the member 101 for certain settings of the adjustment means 65 selected by the operation of the knob 33.

The member 101 is adapted to be rotated in the opening 100 in the bracket 98 as by the squared end portion 107 of the vertical shaft 108 supported by bearing brackets 109 or in any other suitable manner with respect to the timer unit 32. The shaft 108 which is actuated by the knob 66 mounted upon the end of said shaft extending through the top panel 27 is so disposed that the squared end portion 107 registers with a slot 110 extending substantially diametrically of the member 101 and having one end thereof adjacent the finger 104. The slot 110 is generally rectangular in shape as shown in Figures 7, 8 and 10 and slidably accommodates the squared end portion 107 of shaft 108. A spring 111 surrounding the shaft 94 and having its ends anchored in the boss 95 and the arm 97 respectively serves to urge the arm 97 and the member 101 thereon toward the cams 105 and 106 on the shaft 38 of the timer unit 32 or toward the right as seen in Figures 7, 8 and 11.

It is particularly advantageous in the operation of laundry equipment to have the thermostat 87 of the mixer valve unit 63 supplying the cleansing fluid originally set in its mounting for the lowest desired temperature of the fluid to be employed in any of the operating steps in the cycle of operations. The adjustment means 65 for the laundry machine 25 operates to permit the manual selection of a temperature setting for the thermostat 87 of the mixer valve 63 for obtaining fluid at a higher temperature than that for which the thermostat is originally set in keeping with certain of the steps in the operating cycle of the machine as controlled by the timer unit 32. In addition, the adjustment means 65 cooperates with the cams 105 and 106 on the shaft 38 of the timer unit 32 to alter the temperature setting of the thermostat 87 in the course of the performance of the series of steps so that the temperature of the fluid provided will correspond with the selected high temperature setting for one or more of the operations and will, thereafter, return to its original low temperature setting.

It will be understood from Figures 7, 8 and 11 that the shaft 38 of the timer unit 32 and the shaft 108 of the adjustment means 65 are generally parallel to each other and spaced at a fixed distance apart. Thus, if the knob 66 (Figures 3 and 4) is positioned with the pointer thereon adjacent the 100° marking on the plate 113 on the top panel 27 of the cabinet 26, the squared end portion 107 on the shaft 108 by engagement with the slot 110 will position the member 101 substantially in the relation illustrated in Figures 8 and 9. With this setting of the adjustment means 65, the cams 105 and 106 will be out of contact with the respective peripheral portions 103 and 102 of the member 101. The slot 110 in the member 101 is now so disposed with respect to the squared portion 107 that the arm 97 will be retained against the action of the spring 111 in a position such that both cams 105 and 106 on the shaft 38 of the timer unit 32 will be out of contact therewith and will not be actuated as the cam 105 having peripheral portions 114 and 115 thereon is rotated by the timer shaft 38. As a result the mixing valve 63 will deliver fluid at a uniform temperature (in this case 100°) for each of the several operations in the complete cycle performed by the laundering machine 25 in accordance with the operation of the timer unit 32.

However, if the shaft 108 of the adjustment means 65 is now shifted by the knob 66 thereon to a position, for example, with the pointer of the knob 66 disposed at 120° (as seen in Figure 4) the peripheral portions 102 and 103 together with the finger 104 associated with the latter on the member 101 will cooperate with the cams 105 and 106 to shift the arm 97 and through its connecting elements vary the setting of the thermostat 87. The rotation of the shaft 108 by means of the knob 66 and the cooperation of the squared end portion 107 with the slot 110 causes the member 101 rotatably mounted in the bracket 98 on the arm 97 to be shifted so that the finger 104 will be directed toward the shaft 38 of the timer unit 32 in the manner indicated in Figure 11.

By virtue of the fact that the first step in the cycle of operations of the laundry machine 25 is ordinarily a soaking operation, it is desired to supply water of relatively low temperature such, for example, as 75° F. to the tub 28. It is thus advantageous to so construct the adjustment means 65 that the finger 104 will, upon the shifting of the knob 66 and its shaft 108, cause the finger portion 104 on the member 101 to register with a low point or cut-away portion 115 on the cam 105 disposed adjacent said finger.

With the several parts of the adjustment means 65 disposed in the position indicated in Figure 11, it will be understood that the elongated opening 100 in the bracket 98 and the slot 110 in the member 101 will afford a certain degree of freedom of movement of the arm 97 with respect to the squared end portion 107 of the shaft 108. It is advantageous, therefore, in order to prevent the arm 97 from swinging too far to the right as seen in Figure 11 which winds the thermostat 87 more tightly and causes the mixing valve 63 to deliver fluid of a temperature below the desired minimum to bring the peripheral portion 102 on the member 101 into contact with the periphery of the cam 106 (see Figure 12). This operation restrains, to a certain extent, the biasing effect of the spring 111 on said arm 97. Water at a minimum temperature of 75° F. will be supplied to the tub 28 for the soaking operation.

As the shaft 38 of the timer unit 32 is actuated following the soaking operation, for controlling the operation of the laundry machine in each of a plurality of successive steps in the complete cycle thereof, the cams 105 and 106 mounted on said shaft will be rotated. The peripheral portion 115a of the cut-away portion 115 on the cam 105 eventually contacts the curved surface of the finger 104 as the cam rotates in a clockwise direction. This operation produces a camming action on the member 101 causing the arm 97 on which it is mounted to move toward the left as seen in Figure 11, with respect to the squared end portion 107 of the shaft 108.

As the cam 105 continues to rotate the finger 104 of member 101 will ultimately register with the arcuate portion 114 on the periphery of said cam 105 and, thereafter, the several parts of the adjustment means 65 will assume the relative arrangement illustrated in Figure 7. The shifting of the arm 97, as we have seen, results in the rotation of the shaft 94 in a counterclockwise direction about its axis so as to move the crank arm 93. The crank arm 93 shifts the lever arm 90 rotating the pin 88 secured thereto in a clockwise direction so as to uncoil the thermostat 87 which in turn alters the adjustment of the valves 81, 83 and 84 so as to change the proportion of hot and cold fluid admitted to the mixing chamber 79 from the inlet passages 71 and 72. During this cycle, water at a temperature of 120° F. will be delivered to the tub 28 for the performance of the washing step, the temperature being controlled by the setting of the knob 33.

As the shaft 38 of the timer unit 32 continues to rotate in completing the cycle of operations of the laundry machine 25, the finger 104 then in contact with the peripheral portion 114 of said cam will eventually register with the radially extending portion 115b of the cut-away portion 115. As this point is reached in the operation, the arm 97 due to the biasing effect of the spring 111 will return to the position illustrated in Figures 11 and 12 with the peripheral portion 102 of the member 101 against the periphery of the cam 106. The finger 104 and the several parts of the adjustment means 65 are once more disposed in their relative arrangement with respect to the squared end portion of the shaft 108 in which they were disposed at the beginning of the cycle of operation of the laundry machine 25. The fluid control mechanism 50 will now operate in accordance with the timer unit 32 to deliver rinse water at the minimum temperature (approximately 75° F.) for one or more rinsing steps.

The timer unit 32 is preferably so constructed that it directs the several steps in the cycle of the laundry machine 25 and coordinates therewith the operation of the fluid control mechanism 50 through the adjustment means 65 to provide the proper quantity of water at the proper temperature for each step. The quantity of water introduced to the tub 28 of the laundry machine 25 through the tube 53 may be controlled by any of several different forms of shut-off valves which are automatically operable as, for example, by the timer unit 32, or other satisfactory mechanical means to shut off the flow of mixed fluids discharged from the outlet connection 117 formed in the casing 67 of the mixing valve 63. One form of shut-off valve which may be advantageously employed is the unit 64 shown in detail in Figures 3 and 5 of the drawings.

The shut-off valve 64 includes a casing 118 having an outlet connection 119 therein for connection in any suitable manner to the tube 53 for filling the tub 28 of the laundry machine 25 and an inlet connection 120 which is adapted to be connected to the outlet 117 for the mixer valve 63. The casing 118 provides an internal well 121 communicating with the inlet connection 120. In the well 121 and in generally concentric relation to the outer wall of the casing 118 is disposed a projecting portion 122 which may be formed integrally with the casing 118. The projecting portion 122 defines an outlet passage 123 which is adapted to interconnect the well 121 and its inlet connection 120 with the outlet connection 119.

The uppermost end of the projecting portion 122 forms a seat 124 against which a flexible diaphragm 125 is seated. The diaphragm 125 is provided with a centrally disposed aperture 126 registering with a passage 127 formed in a core 128, a portion of which is embedded in said diaphragm. The diaphragm 125 is held in place against a shoulder 129 formed in the casing 118 with its annular bead portion 130 disposed between a pair of rings 131 by means of the thimble 132 threaded into the open end of the well 121 in the casing 118. The diaphragm 125 is provided with a plurality of openings 133 in the web portion thereof to provide intercommunication between the well 121 and a chamber 134 defined by the diaphragm 125 and the recess 135 formed in the underside of the thimble 132.

A solenoid 136 is mounted upon and secured to the thimble 132 as by means of a tubular member 137 seated in the recess 135. The tubular member 137 accommodates the core 138 of the solenoid 136 in slidable relation therein for guiding the axial displacement of said core. The core 138 is provided with a cone-shaped portion 139 at one end thereof which is adapted to register with the aperture 126 in the flexible diaphragm 125 for effectively closing off the passage 127 through the core 128.

It will be understood that, with the solenoid 136 deenergized, the core 138 thereof will be disposed in the position indicated in Figure 5, that is, in registration with the aperture 126 and closing off the passage 127 in the core 128 thereby preventing mixed fluid entering through the inlet connection 120 to the well 121 from passing into the outlet passage 123 and thence to the outlet connection 119. The flexible diaphragm 125 is held against its seat 124 on the upper end of the projecting portion 122 by virtue of the fact that the fluid in the well 121 passes through the openings 133 into the chamber 134 thereby equalizing the fluid pressure on opposite sides of said diaphragm and aiding the core 138 of the solenoid 136 in closing the entrance to the outlet passage 123.

As soon as the solenoid 136 is energized by an electrical current supplied from an electrical power source through a suitable circuit of a type which will be described hereinafter, the core 138 retracts within the tubular member 137 opening the aperture 126. The opening of aperture 126 and the passage 127 through the flexible diaphragm 125 and its core 138 permits the fluid entrapped in the chamber 134 to escape into the outlet passage 123. The escape of the fluid from the chamber 134 now unbalances the fluid pressure previously equalized on both sides of the flexible diaphragm 125 and, as a result, the pressure of the fluid in the well 121 raises the flexible diaphragm 125 from its seat 124.

This action permits the fluid entering the well 121 from the mixer valve 63 through the inlet connection 120 to pass directly through the outlet passage 123, outlet connection 119 and the tube 53 into the tub 28 of the laundry machine 25. As soon as the desired quantity of fluid has been admitted to the tub 28, the solenoid 136 will be automatically deenergized again causing the core 138 thereof to register with the aperture 126 in the flexible diaphragm 125. The closing of the passage 127 in the core 128 once more permits the fluid pressure on opposite sides of the flexible diaphragm 125 to become equalized to seat the diaphragm.

The operation of the fluid control mechanism 50 and particularly the shut-off valve 64 thereof will be best understood from Figure 17 which illustrates a diagrammatic representation of a typical electrical circuit embodying the timer unit 32 of the laundry machine 25 and coordinating the operation of said fluid control mechanism with the various steps in the operation of the laundry machine. The details of construction of a typical timer unit and the relative arrangement of the cams 34 to 37, inclusive, employed in the operation of energizing the several elements of the laundry machine 25 are illustrated in Figures 13 to 16, inclusive.

In the circuit of Figure 17, a pair of main power supply conductors 141 and 142 serve to provide electrical current from a suitable power source. The cam 34 on the shaft 38 of the timer unit 32 is provided with a generally circular periphery on which are disposed a plurality of projections 143 and 144. The projections 143 and 144 on the cam 34 serve to operate the movable contact arm 40 associated therewith to break contact with the fixed contact 44. At all other times in the operation of the timer unit 32, the contact arm 40 will be in contact with its fixed contact 44 completing an electrical circuit from the main power supply conductor 141 through conductor 145, contact 44, movable contact arm 40, and conductor 146 to one side of the timer motor 39. The other side of the timer motor 39 is directly connected with the main power supply conductor 142. The cam 34 also serves to operate the main motor 31 for the laundry machine 25 by virtue of it being inter-connected with the conductor 146 and the main power supply conductor 142 by means of the conductors 147 and 148.

The cam 35 is provided with projecting portions 149, 150 and 151 which, in this case, serve to close the movable contact arm 41 associated with the cam 35 against its fixed contact 45 and permitting contact therebetween to be broken upon registration of the movable contact arm 41 with the indentations interspersed between the aforementioned projections. The cam 35 controls the operation of the shut-off valve 64 of the fluid control mechanism 50 by the energization and deenergization of the solenoid 136 employed in its operation. The circuit associated with the cam 35 is completed when the contact arm 41 is against the fixed contact 45 from the main power supply conductor 141 through conductors 153 and 154 to the solenoid 136. The other side of solenoid 136 is connected through conductor 155 to one side of the switch means 61 which is closed, as shown, when the float member 60 operating the same is down thereby to complete the circuit through the conductor 156 to the other main power supply conductor 142.

It will be understood from Figure 17 that the switch means 61 will remain closed as indicated until such time as the float 60 disposed in the stand pipe 59 (see Figure 2) is raised with the rising of the water level in the tub 28 by virtue of the interconnection of the stand pipe 59 with said tub by means of the pipe 62. Thus, as soon as the proper quantity of water has been admitted to the tub 28 the switch means 61 will be opened by the action of the float pivoting the contact member 157 about the pivot 158 so as to break contact with its fixed contacts 159 and 160. This operation immediately breaks the circuit through the solenoid 136 causing it to be deenergized and, as we have seen, actuating the flexible diaphragm 125 of the shut-off valve 64 so as to close the outlet passage 123 and shut off the supply of fluid admitted through the tube 53 to the tub 28 of the laundry machine 25.

The cam 36 on the shaft 38 of the timer unit 32 serves to operate the drain valve 58 and the pump unit 161 associated therewith through the operation of a solenoid 162 (see Figure 2). As in the case of the cam 35, the cam 36 is provided with a plurality of projections 163, 164 and 165 formed on the periphery thereof which are adapted to urge the movable contact arm 42 associated with said cam disk 36 into contact with its fixed contact 46. This operation closes a circuit from the main power supply conductor 141 through the conductors 166 and 167, through the solenoid 162, and conductors 168 and 169 to the other main power supply conductor 142.

The cam 37 is provided with a single projection 170 which serves to operate the movable contact arm 43 associated therewith to make contact with its fixed contact 47 at the proper interval in the operation of the timer unit 32 as the shaft 38 thereof is rotated. The cam 37 is employed to control the energization of a suitable solenoid 171 which actuates a clutch member 172 for changing the speed of rotation of the basket 29 in the drying operation. The movable contact arm 43 makes contact with its fixed contact 47 which is directly connected to the main power supply conductor 141 through the conductor 173, the solenoid 171, and conductor 169 with the other main power supply conductor 142.

With the actuation of the shaft 38 of the timer unit 32 by the motor 39, the rotation of the cam 37 will bring the projection 170 thereon into registration with the follower of the movable contact arm 143 for only a short interval at or near the completion of the entire cycle of operation controlled by the timer unit 32. This interval corresponds with the final drying operation in which the perforated basket 29 is rotated at a high speed to remove substantially all of the water from the articles being laundered before they are removed from the machine.

Another convenient form of device for controlling the quantity of fluid discharged from the mixing valve 63 for filling the tub 28 of the laundry machine 25 is the shut-off valve 64a illustrated in Figure 19. The valve 64a may advantageously be substituted for the shut-off valve 64 in the fluid control mechanism 50. The shut-off valve 64a has a casing 175 having an inlet connection 176 adapted to be interconnected with the outlet 117 of the mixer valve 63 and to communicate with the well 177 formed in said casing. An elbow 178 having a female connection 179 at one end thereof is adapted to be inserted in an aperture in the wall of the casing 175 in such fashion that its other end is disposed in the well 177 to position the seat 180 thereon for sealing contact with the flexible diaphragm 181.

The female connection 179 is adapted to receive a male connector 182 having a flow control member, which may advantageously take the form of a flexible washer 183, fitted into a generally cylindrically shaped recess 184 formed by counterboring the axially extending bore 185 of said male connector. The washer 183, which may be made of rubber, artificial rubber, neoprene or any other similar flexible material, has a central aperture 186 therein of somewhat smaller diameter than the bore 185. The aperture 186 forms, by reason of the flexibility of the material of which the washer 183 is formed, an adjustable orifice operating to permit the passage of only a predetermined quantity of fluid through the bore 185 of the male connector 182.

The flexible diaphragm 181 which is provided with a plurality of openings 187 in the web portion thereof is held in place as by means of a cover member 188 secured to the casing 175 of the shut-off valve 64a as by means of a plurality of screws 189 which may be threaded into the outturned flange portions 190 formed on said casing. The cover member 188 has a recess 191 formed on the underside thereof and enclosing a chamber 192 which communicates with the well 177 in the casing 175 as by means of the openings 187 in the flexible diaphragm 181 and with the outlet passage 193 formed in the elbow member 178 through the passage 194 formed substantially through the center of the diaphragm 181.

In place of the solenoid employed in the previously described form of shut-off valve 64, there is provided in the shut-off valve 64a a mechanically shiftable valve member 195 the cone-shaped end 196 of which is adapted to register with the passage 194 extending through the flexible diaphragm 181 so as to prevent communication between the chamber 192 and the outlet passage 193. The tubular member 197 secured to the cover member 188 and extending through a substantially centrally disposed aperture therein serves to guide the valve member 195 in its axial movement.

A suitable enclosure 198 is secured to the outer surface of the cover member 188 and adapted to surround the valve member 195 and the tubular member 197. The enclosure 198 also supports a suitable bearing member 199 (see Figure 18) in which is rotatably mounted a shaft 200 having a pin 201 disposed transversely of its axis for driving connection with a slotted end of a connecting member, such as the element 202 (see Figure 20). The member 202 may be rotatably actuated from a timer or driven in some suitable manner from the timer unit 32 when the device is associated with a laundry machine such, for example, as that of Figures 1 and 2.

As will be seen in Figure 19, a generally cup-shaped member 203 is secured to the other end of the shaft 200 which projects through the bearing member 199 into the interior of the housing 198. The cup-shaped member 203 is provided with a plurality of notches formed in the generally circular periphery thereof in order that a plurality of projecting portions 204 to 207, inclusive, remain, so as to form in effect, a cam surface. A bell crank arm 208 is pivotally mounted between the tangs of a support 210 secured to the inner wall of the housing or enclosure 198 in such fashion that the bent portion or follower 209 on said arm will contact the periphery or cam surface of the cup-shaped member 203 so as to lift the valve member 195 secured to the other leg of the arm 208 with respect to the passage 194 in the flexible diaphragm 181 when said follower is in contact with one of the projecting portions 204 to 207, inclusive, on said cup-shaped member 203.

When the follower 209 of the bell crank arm 208 registers with one of the notches interspersing the several raised portions 204 to 207, inclusive, on the cup-shaped member 203, the valve member 195 will be disposed in contact with the passage 194 so as to close off the opening in the flexible diaphragm 181. The operation of the bell crank arm 208 and the valve member 195 is clearly illustrated in Figure 20. The flexible diaphragm 181, when the valve member 195 is withdrawn from registration with the passage 194, will act in the manner described in connection with the operation of the solenoid type shut-off valve 64 of Figure 5.

When the shut-off valve 64a is employed in conjunction with the mixing valve 63 and the adjustment means 65 in a fluid control mechanism 50 there will be no need to employ a float control embodying a float member 60 and the stand pipe 59. The washer 183 employed in the male connector 182 of the valve 64a accurately controls the flow of the fluid through the connecting tube 53 and into the tub 28. Therefore, exactly the correct quantity of water will pass through the opening 186 in the washer 183 to fill the tub to the proper operating level in the interval of time dictated by the operation of the cup-shaped member 203 from the timer unit.

It will be understood that the interval for the rotation of the shaft 200 upon which the cup-shaped member 203 is mounted will be of a timed duration to retain the valve member 195 of the shut-off valve 64a out of contact with the flexible diaphragm 181 for a sufficient length of time to permit the proper quantity of water, depending upon the rate of flow for which the washer 183 is designed, to enter the tub 28 and fill it up to the proper level. No variations in the pressure of the fluid supply will affect the rate at which the fluid passes through the bore 185 of the male connector 182 due to the flexible character of the washer 183 which causes the washer to adjust itself and thereby to diminish the opening 186, to compensate for increases in pressure of the fluid. This factor produces a constant flow of fluid through the bore 185 of the male connector 182.

Still another form of shut-off valve which may be employed in the fluid control mechanism 50 of the present invention is that designated in Figures 20 and 21 by the reference character 64b. The shut-off valve 64b is generally similar to the unit 64a of Figures 18 and 19 differing therefrom principally in that a so-called weight control unit indicated generally by the reference character 212 may be employed to insure that the valve 195 will seat the flexible diaphragm 181 in contact with the seat 180 on the elbow member 178 when the tub 28 has been filled to the maximum level. The weight control unit 212 may, if desired, be substituted for the flow control member or washer 183 which may be omitted entirely from the structure. Alternatively, the weight control unit 212 may act as a safety feature to actuate the shut-off valve 64b, in the event that a mishap should occur, to prevent overflow of the fluid from the tub 28 of the laundry machine 25 which might under some circumstances damage the motor or other operating elements of the apparatus.

The weight control unit 212 embodies a lever arm 213 which is pivotally secured as by means of a pin 215 in a bracket 214 mounted on the cover member 188. The arm 213 is provided with two legs 216 and 217 disposed substantially at right angles to each other. The leg 217 supports from its free end a bucket 218 having a connection 219 in the base thereof to which a flexible tube or hose 220 may be secured as by means of a clamp 221. The hose 220 is interconnected with the tub 28 of the laundry machine 25 at a point in the wall thereof adjacent the maximum water level desired to be maintained for at least certain of the operations to be performed in the apparatus. The bucket 218 is thus intended to be filled with fluid admitted thereto from the tub 28 so as to depress the lever arm 213 against the biasing action of a loop spring 222 fitted about the pin 215 and adapted to urge said lever arm into its upright position (see Figure 20).

The leg 216 of the lever arm 213 is provided with a ball-shaped end 223 which registers with an annular groove 224 formed in a collar member 225 secured as by means of a set screw 226 to the shaft 200 adjacent the end thereof nearest the pin 201. The bearing member 199a secured to the housing 198 differs slightly from the bearing 199 of the unit 64a in that it is adapted to permit both radial and axial movement of the shaft 200 on which is mounted the cup-shaped member 203. The shaft 200 is provided with a pair of spaced annular grooves 227 and 228 disposed substantially intermediate the ends of the shaft 200. The grooves 227 and 228 are adapted to register, each in its turn, with a spring-pressed detent 229 disposed in said bearing member 199a.

Thus, as the tube 28 of the laundry machine 25 is being filled with fluid to the proper operating level, the spring 222 retains the lever arm 213 in the position illustrated in Figure 20 thereby causing the follower 209 to contact with the cam surface afforded by the periphery of the cup-shaped member 203 throughout the rotation of the shaft 200 in its timed interval from the connecting member 202. If the level of the fluid admitted to the tub 28 continues to rise beyond the maximum fluid level, the fluid will pass through the hose 220 and connection 219 into the bucket 218 which, upon becoming filled with fluid, depresses the leg 217 of the lever arm 213 about the pin 215 against the biasing action of the spring 222.

The leg 216 of the lever arm 213, by reason of its connection with the collar member 225, moves the shaft 200 axially in the bearing member 199a upon the shifting of the lever arm disengaging the detent 229 from the annular groove 227 and causing it to register with the adjacent annular groove 228. The axial movement of the shaft 200 will not, as can be seen from Figures 20 and 21, disengage the pin 201 from the slot in the connecting member 202 but will, nevertheless, withdraw the cup-shaped member 203 from contact with the follower 209 on the bell crank arm 208.

This operation, as is fully demonstrated from the dotted and full line positions of the cup-shaped member 203 shown in Figure 21, will thus cause the valve member 195 to drop downwardly contacting the open end of the passage 194 in the flexible diaphragm 181. This causes the flexible diaphragm 181 to seat itself against the seat 180 on the uppermost end of the elbow member 178 cutting off the flow of additional fluid through the outlet passage 193 and the bore 185 in the male connector 182. The weight control unit 212 serves to stop the introduction of fluid to the tub 28 irrespective of the continued operation of the shaft 200 and the cup-shaped member 303.

The fluid control mechanism 50 illustrated and described hereinabove will find suitable application with any form of fluid handling equipment. It is especially advantageous in the washing machine field for the reason that it is, as we have seen, capable of automatically controlling not only the quantity but the temperature of the fluid supplied to the apparatus. Moreover, the unit permits variations in the temperature of the fluid supply during the automatic operation of the apparatus.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In combination, apparatus for the performance of a plurality of cleansing operations including a container for cleansing fluid, timer means for directing the operation of the cleansing apparatus, a mixer valve for automatically controlling the temperature of the cleansing fluid supplied to the container for each step in the cleansing operations, manually adjustable means for selectively predetermining the temperature of the fluid for at least one of the cleansing operations, means on said adjustable means coacting with the timer means for actuating the mixer valve to shift the mixer valve to vary the temperature of the cleansing fluid in the course of the cleansing operations, and means operated by the timer means for controlling the quantity of cleansing fluid supplied to the container for each operation.

2. In combination, apparatus for the performance of a plurality of cleansing operations including a container for cleansing fluid, timer means for directing the operation of the cleansing apparatus, a mixer valve for automatically controlling the temperature of the cleansing fluid supplied to the container for each step in the cleansing operations, manually adjustable means for selectively predetermining the temperature of the fluid for at least one of the cleansing operations, means on said adjustable means coacting with the timer means for actuating the mixer valve to shift the mixer valve to vary the temperature of the cleansing fluid in the course of the cleansing operations, and flow control means coacting with the timer means to deliver a fixed quantity of cleansing fluid to the container for each cleansing operation irrespective of variations in fluid pressure.

3. In combination, apparatus for the performance of a plurality of cleansing operations including a container for cleansing fluid, timer means for directing the operation of the cleansing apparatus, a mixer valve for automatically controlling the temperature of the cleansing fluid supplied to the container for each step in the cleansing operations, manually adjustable means for selectively predetermining the temperature of the fluid for at least one of the cleansing operations, means on said adjustable means coacting with the timer means for actuating the mixer valve to shift the mixer valve to vary the temperature of the cleansing fluid in the course of the cleansing operations, and weight control means interconnected with the container and for shutting off the flow of cleansing fluid from the mixer valve to the container when the maximum fluid level for each operation has been reached irrespective of the timer means.

4. In an automatic laundry machine including a tub and a timer, a fluid control mechanism comprising a mixing valve, hot and cold water inlets by means of which the mixing valve is connected to separate sources of hot and cold water, valves for controlling the said hot and cold water inlets for varying the relative amounts of hot and cold water entering said mixing valve, a thermostat connected with said valves which moves said valves responsive to variation in temperature of the mixed hot and cold water, said thermostat having a coil type bimetallic thermal-responsive control element, a connection between said mixing valve and said tub through which water is delivered to the tub, a variable connection between said timer and said thermostat selectively positionable to effect adjustment of the thermal responsive element of said thermostat independently of the timer by the action of said timer to vary the temperature of the water delivered to the tub in accordance with the setting of said timer, a shut-off valve between the mixing valve and the tub, a solenoid for controlling said valve, and means actuated by said timer for controlling said solenoid to open and close the connection between said mixing valve and said tub, and automatic means for limiting the time when the valve between the mixing valve and the tub is opened and closed, whereby hot water is conserved.

5. A fluid control mechanism comprising a mixer valve unit having a thermostat therein for regulating the temperature of the mixed fluid discharged by said valve unit, a timer operatively connected with said thermostat and operable to vary the setting of the thermal responsive element of said thermostat in accordance with a predetermined sequence of temperature settings, biasing means in the operative connection between said timer and said thermostat for maintaining the thermostat at one of its operative settings, said timer operating against said biasing means and the operative connection from said timer to said thermostat also including manually operated control means for selectively determining at least one additional setting of the thermostat and means for temporarily adjusting the biasing means to change the setting of the thermostat during the operation of the mixer valve to produce mixed fluid of the selected temperature, and a shut-off valve for controlling the quantity of mixed fluid discharged from the mixer valve unit.

6. A fluid control mechanism comprising a mixer valve unit having a thermostat therein for regulating the temperature of the mixed fluid discharged by said valve unit, biasing means for maintaining the thermostat at one of its operative settings, manually operated control means for selectively determining at least one additional setting of the thermostat, means for temporarily adjusting the biasing means to change the setting of the thermostat during the operation of the mixer valve to produce mixed fluid of the selected temperature, a shut-off valve for opening and closing the mixer valve unit to control the quantity of mixed fluid discharged therefrom, and weight control means employing the mixed fluid to actuate the shut-off valve.

7. In an automatic laundry machine embodying a tub in which a plurality of laundering steps are performed, a timer for controlling the sequence and duration of the laundering steps and separate sources of supply for hot and cold water, a fluid control mechanism comprising a thermostatically controlled mixer valve connected to the sources of hot and cold water for supplying mixed water to the tub, the thermostat of said mixer valve being maintained at one of its settings to produce mixed water at a uniform temperature for certain of the steps in the laundering operation, manually operated means for selectively determining at least one other temperature setting for the thermostat of the mixer valve which differs from the previously mentioned setting of said thermostat, means on the timer for temporarily adjusting the thermostat to deliver mixed water at the selected temperature for at least one of the laundering steps in the sequence controlled by the timer, and a shut-off valve coacting with the timer for controlling the quantity of mixed water supplied to the tub by the mixer valve unit.

8. In an automatic laundry machine embodying a tub in which a plurality of laundering steps are performed, a timer for controlling the sequence and duration of the laundering steps and separate sources of supply for hot and cold water, a fluid control mechanism comprising a thermostatically controlled mixer valve connected to the sources of hot and cold water for supplying mixed water to the tub, the thermostat of said mixer valve being maintained at one of its settings to produce mixed water at a uniform temperature for certain of the steps in the laundering operation, manually operated means for selectively determining at least one other temperature setting for the thermostat of the mixer valve which differs from the previously mentioned setting of said thermostat, means on the timer for temporarily adjusting the thermostat to deliver mixed water at the selected temperature for at least one of the laundering steps in the sequence controlled by the timer, a shut-off valve actuated by the timer for controlling the flow of mixed water from the mixer valve to the tub, and flow control means for maintaining a constant rate of flow of the mixed water from the mixer valve to the tub irrespective of variations in the pressure of the hot and cold water supplies.

9. In an automatic laundry machine embodying a tub in which a plurality of laundering steps are performed, a timer for controlling the sequence and duration of the laundering steps and separate sources of supply for hot and cold water, a fluid control mechanism comprising a thermostatically controlled mixer valve connected to the sources of hot and cold water for supplying mixed water to the tub, the thermostat of said mixer valve being maintained at one of its settings to produce mixed water at a uniform temperature for certain of the steps in the laundering operation, manually operated means for selectively determining at least one other temperature setting for the thermostat of the mixer valve which differs from the previously mentioned setting of said thermostat, means on the timer for temporarily adjusting the thermostat to deliver mixed water at the selected temperature for at least one of the laundering steps in the sequence controlled by the timer, a shut-off valve actuated by the timer for controlling the flow of mixed water from the mixer valve to the tub, and safety means for closing the shut-off valve independently of the timer when the water in the tub reaches a predetermined level.

10. In an automatic laundry machine embodying a tub in which a plurality of laundering steps are performed, a timer for controlling the sequence and duration of the laundering steps and separate sources of supply for hot and cold water, a fluid control mechanism comprising a thermostatically controlled mixer valve connected to the sources of hot and cold water for supplying mixed water to the tub, the thermostat of said mixer valve being maintained at one of its settings to produce mixed water at a uniform temperature for certain of the steps in the laundering operation, manually operated means for selectively determining at least one other temperature setting for the thermostat of the mixer valve which differs from the previously mentioned setting of said thermostat, means on the timer for temporarily adjusting the thermostat to deliver mixed water at the selected temperature for at least one of the laundering steps in the sequence controlled by the timer, a shut-off valve actuated by the timer for controlling the flow of mixed water from the mixer valve to the tub, and weight control means connected to the tub for disconnecting the shut-off valve from the timer when the water in the tub reaches a predetermined level.

11. In an automatic laundry machine including a tub, a timer and separate sources of supply for hot and cold water, a fluid control mechanism comprising a thermostatically controlled mixer valve connected to the sources of hot and cold water for supplying mixed water to the tub, the thermostat of said mixer valve being maintained at one of its settings to produce mixed water at a uniform temperature for certain of the steps in the laundering operation, manually operated means for selectively determining at least one other temperature setting for the thermostat of the mixer valve which differs from the previously mentioned setting of said thermostat, and cam means on the timer operatively connected with said manually operable means for temporarily changing the setting of the thermostat in the mixer valve to deliver mixed water at the manually selected temperature to the tub determined by the setting of the timer for the performance of at least one of the laundering steps in the sequence controlled by the timer, said cam means allowing the thermostat thereafter to assume its original setting for the remainder of the laundering steps in the sequence.

12. An apparatus for washing fabrics comprising a mixing valve, comprising hot and cold water inlets, by means of which the mixing valve is connected to separate sources of hot and cold water, valves for controlling the hot and cold water inlets for varying the relative amounts of hot and cold water entering the mixing valve, a thermostat connected with said valves and moving said valves responsive to variations in temperature of the mixed hot and cold water, a timer having a shaft, a motor for moving said timer shaft, a variable connection between said timer shaft and said thermostat, by means of which the position of the thermal responsive element of said thermostat is automatically adjusted to vary the temperature of the water delivered from said mixing valve in accordance with the setting of said timer, and said variable connection including a member selectively operable to effect a limit to the adjustment of said thermostat by said timer independently of the setting of said timer.

13. An apparatus for washing fabrics comprising a mixing valve, comprising hot and cold water inlets, by means of which the mixing valve is connected to separate sources of hot and cold water, valves for controlling the hot and cold water inlets for varying the relative amounts of hot and cold water entering the mixing valve, a thermostat connected with said valves which moves said valves responsive to variations in temperature of the mixed hot and cold water, a timer having a shaft, a motor for moving said timer shaft, a variable connection between said timer shaft and said thermostat, by means of which the thermostat itself is automatically adjusted to vary the temperature of the water delivered from said mixing valve, said variable connection comprising a cam and a disk on said timer shaft, an adjusting member connected with said thermostat, and a cam and disk connected with said adjusting member cooperating with said cam and disk respectively on said timer shaft, the disc on said adjusting member being movable into abutting contact with the disc on said timer shaft to limit the adjusting movement of said variable connection and the cam on said adjusting means being movable into position for contact by the camming surface of the cam on said timer as it is rotated by the timer.

14. An apparatus for washing fabrics comprising a mixing valve, comprising hot and cold water inlets, by means of which the mixing valve is connected to separate sources of hot and cold water, valves for controlling the hot and cold water inlets for varying the relative amounts of hot and cold water entering the mixing valve, a thermostat connected with said valves which moves said valves responsive to variations in temperature of the mixed hot and cold water, a timer having a shaft, a motor for moving said timer shaft, a variable connection between said timer shaft and said thermostat by means of which the thermostat is automatically adjusted to vary the temperature of the water delivered from said mixing valve, said variable connection comprising a cam and a disk on said timer shaft, an adjusting member connected with said thermostat, a cam and disk connected with said adjusting member cooperating with said cam and disk on said timer shaft, a discharge valve for said mixing valve, an electro-magnetic device for controlling said discharge valve, and an electric circuit controlling device actuated by said timer shaft for controlling the circuit through said electro-magnetic device to cause the discharge valve of said mixing valve to automatically open and close.

15. An apparatus for washing fabrics comprising a mixing valve, comprising hot and cold water inlets, by means of which the mixing valve is connected to separate sources of hot and cold water, valves for controlling the hot and cold water inlets for varying the relative amounts of hot and cold water entering the mixing valve, a thermostat connected with said valves which moves said valves responsive to variations in temperature of the mixed hot and cold water, a timer having a shaft, a motor for moving said timer shaft, a variable connection between said timer shaft and said thermostat, by means of which the thermostat is automatically adjusted to vary the temperature of the water delivered from said mixing valve, said variable connection comprising a cam and a disk on said timer shaft, an adjusting member connected with said thermostat, a cam and disk connected with said adjusting member cooperating with said cam and disk on said timer shaft, a discharge valve for said mixing valve, an electro-magnetic device for controlling said discharge valve, and an electric circuit controlling device actuated by said timer shaft for controlling the circuit through said electro-magnetic device to cause the discharge valve of said mixing valve to automatically open and close, an automatic means for opening and closing said discharge valve at predetermined time intervals.

16. In an automatic laundry machine including a tub, a timer and separate sources of supply of hot and cold water, a fluid control mechanism comprising a mixer valve having an adjustable thermostat connected to the sources of hot and cold water for supplying mixed water to the tub, adjustable means between said timer and said thermostat for varying the setting of the thermal responsive element of said thermostat independently of the setting of said timer, a cam associated with said timer operable on said adjustable means for moving said means to change the setting of said thermostat for raising and lowering the temperature of the water in the mixer valve in accordance with the setting of said timer, said adjustable means being movable out of contact with said cam for setting said thermostat for a constant temperature of water in said mixer valve.

17. In an automatic laundry machine including a tub and timer means, a mixing valve comprising hot and cold water inlets by means of which the mixing valve is connected to separate sources of hot and cold water, valves for controlling the said hot and cold water inlets for varying the relative amounts of hot and cold water entering said mixing valve, a thermostat connected with said valves which moves said valves responsive to variation in temperature of the mixed hot and cold water, a connection between said mixing valve and said tub through which water is delivered to the tub, a variable connection between said timer and said thermostat selectively positionable to effect adjustment of the thermal responsive element of said thermostat to select a temperature setting of said thermostat independently of said timer and by the action of said timer to vary the temperature of the water delivered to the tub in accordance with a predetermined sequence over a range of temperatures determined by the setting of said timer, a shut-off valve in the connection between the mixing valve and the tub, a solenoid for controlling said shut-off valve, and means actuated by the timer means for controlling the solenoid to open and close the connection between said mixing valve and said tub.

18. In an automatic laundry machine including a tub and a timer, a mixing valve device comprising hot and cold water inlets by means of which the mixing valve is connected to separate sources of hot and cold water, valves for controlling the said hot and cold water inlets for varying the relative amounts of hot and cold water entering said mixing valve, a thermostat connected with said valves which moves said valves responsive to variation in temperature of the mixed hot and cold water, a connection between said mixing valve and said tub through which water is delivered to the tub, a variable connection between said timer and said thermostat selectively positionable to effect adjustment of the thermal-responsive element of said thermostat to select a minimum temperature setting of said thermostat independently of the timer and by the action of said timer to vary the temperature of the water delivered to the tub in accordance with any predetermined sequence of a plurality of temperatures in accordance with the setting of said timer, a shut-off valve in the connection between the mixing valve and the tub, and means for automatically controlling said thermostat and the shut-off valve as the washing cycle proceeds.

19. In an automatic laundry machine including a tub and a timer, a mixing valve device comprising hot and cold water inlets by means of which the mixing valve is connected to separate sources of hot and cold water, valves for controlling the said hot and cold water inlets for varying the relative amounts of hot and cold water entering said mixing valve, a thermostat connected with said valves which moves said valves responsive to variations in temperature of the mixed hot and cold water, said thermostat having a coil type bimetallic thermal-responsive control element, a connection between said mixing valve and said tub through which water is delivered to the tub and a variable connection between said timer and said thermostat selectively positionable to effect adjustment of the thermal responsive element of said thermostat in accordance with a desired temperature limit setting independently of the timer and by the action of said timer to vary the temperature of the water delivered to the tub in accordance with the setting of said timer, and means for selectively adjusting the variable connection to predetermine the setting of the thermostat for at least one of the steps in the laundering operation.

20. In an automatic laundry machine including a tub, a timer, separate sources of hot and cold water, a fluid control mechanism comprising a thermostatically controlled mixer valve connected to the sources of hot and cold water for supplying mixed water to the tub, said mixer valve including a coil type bimetallic thermal-responsive element normally maintained in one position to produce mixed water at a uniform temperature for certain of the steps in the laundering operation, manually operated means for selectively determining at least one other temperature setting for said thermal-responsive element of the mixer valve which differs from the previously mentioned setting of said thermal-responsive element, and means on the timer operatively connected with said manually operated means for temporarily adjusting the position of the thermal-responsive element to deliver mixed water at the selected temperature for at least one of the laundering steps in the sequence controlled by the timer.

THOMAS B. CHACE.
CLYDE A. BROWN.

REFERENCES CITED

The following references are of record in the file of this patent:

UNITED STATES PATENTS

| Number | Name | Date |
| --- | --- | --- |
| 1,430,852 | Roesch | Oct. 3, 1922 |
| 1,630,305 | Norwood | May 31, 1927 |
| 1,715,662 | Laskey | June 4, 1929 |
| 1,940,549 | Jones | Dec. 19, 1933 |
| 2,064,053 | Balzer | Dec. 15, 1936 |
| 2,079,397 | Beauregard | May 4, 1937 |
| 2,287,810 | Lund | June 30, 1942 |
| 2,313,928 | Dyer | Mar. 18, 1943 |
| 2,321,573 | Chace | June 15, 1943 |
| 2,321,641 | Anderson | June 15, 1943 |
| 2,346,259 | Hutchings | Apr. 11, 1944 |
| 2,356,816 | Breckenridge | Aug. 29, 1944 |
| 2,377,551 | Harvey | June 5, 1945 |
| 2,442,886 | Bowen | June 8, 1948 |